United States Patent [19]

Cueli

[11] Patent Number: 5,021,466

[45] Date of Patent: Jun. 4, 1991

[54] NOVEL UV CURABLE POLYACRYLATE/SOLVENT COMPOSITIONS

[76] Inventor: Peter Cueli, 555 Hillsborough Rd., Bellemead, N.J. 08502

[21] Appl. No.: 261,696

[22] Filed: Oct. 24, 1988

Related U.S. Application Data

[63] Continuation-in-part of Ser. No. 818,244, Jan. 13, 1986.

[51] Int. Cl.$^5$ .............................................. C08K 0/00
[52] U.S. Cl. ....................................... 522/75; 522/79; 524/317; 524/356; 524/360; 524/376; 524/378; 524/555; 524/558; 524/559
[58] Field of Search ............... 524/317, 555, 558, 559, 524/376, 378, 356, 360; 522/79, 75

[56] References Cited

U.S. PATENT DOCUMENTS

| | | | |
|---|---|---|---|
| 4,012,559 | 3/1977 | Fujioka et al. | 522/79 |
| 4,169,732 | 10/1979 | Shipley | 522/79 X |
| 4,499,176 | 2/1985 | Curtis et al. | 522/79 X |

Primary Examiner—Joseph L. Schofer
Assistant Examiner—J. M. Reddick
Attorney, Agent, or Firm—Omri M. Behr

[57] ABSTRACT

There is provided a novel substantially anhydrous UV curable composition comprising a monomer and a solvent wherein the monomer is a multi-functional non-oxygen inhibited polyacrylate and the solvent is a low volatility solvent containing at least 2 oxygenated functions which is substantially incorporated into the polymer during the curing step. There is also provided a method of curing such compositions which avoids the conventional drying step required heretofore.

11 Claims, No Drawings

NOVEL UV CURABLE POLYACRYLATE/SOLVENT COMPOSITIONS

RELATED APPLICATIONS

This application is a continuation in part of applicant's copending application Ser. No. 818 244 filed Jan. 13, 1986.

BACKGROUND OF THE INVENTION

UV curable coatings have been, in the main, composed of three (3) components—(1) a UV activated catalyst, (2) an unsaturated polyester of a multi-functional acrylate or acrylate oligomer and, (3) a low viscosity monomer such as styrene, an acrylate, methacrylate, vinyl pyrrolidone, or vinyl caprolactone, etc. A newer type of UV curable coating replace group three (3) by solvents which are removed prior to UV curing.

It would be desirable to avoid the toxicity problem of the third component of the coating while avoiding and also the need for solvent removal.

Multi-functional, non-oxygen inhibited polyacrylates, such as dipentaerythritol hydroxy pentacrylate are a well known group of UV curable monomers. These are however too viscous to be readily used in many coating procedures where thin coatings (final after-cure thickness) of between 3 to 4 microns, up to about 250 microns (1 mil) are required. Traditionally, as stated above, this problem had been overcome by using vinyl monomers or heat dried solvents. Many of the previously used solvent/diluents have the disadvantage of being environmentally hazardous. This manifests itself either in the formation of hazardous vapor during the curing step when the solvent is driven off or else the solvent/monomer mixture gives off undesirable vapors or is a skin irritant against which protective clothing would be required. Unfortunately however, in many locations where these materials are used, ventilation is either inadequate or the proper protective clothing is not used. It would therefore be desirable to find a solvent system which would avoid either or both of these problems.

SUMMARY OF THE INVENTION

It has been the surprising finding of the present invention that when certain well known solvents, all carrying at least two oxygen containing functions which are more concisely defined hereinbelow, are utilized as solvents for the multi-functional, non-oxygen inhibited polyacrylates, monomers in the range of between 9 and 1 part of the monomer per part of solvent, the solvent is, for the most part, apparently incorporated into the polymer system and is not driven off as a vapor which must be handled in the conventional manner. The UV curable compositions of the present invention are substantially anhydrous.

Furthermore, certain solvents in this category are substantially innocuous and are not skin irritants when they come into contact with human skin. The solvents utilizable in the present invention can be generally expressed within the following formula:

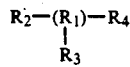

wherein $R_1$ is a substituted straight or branched chain alkanetriyl moiety of 2 to 6 carbon atoms, $R_2$ is selected from the group consisting of hydrogen, hydroxy and COOH, $R_3$ and $R_4$ are selected from the group consisting of hydrogen, OH, —(CO)OR$_5$—, O(CO)R$_6$, R$_1$O and R$_7$ OR$_8$ O—, wherein $R_5$, $R_6$, $R_7$ and $R_8$ are straight or branched chain alkyl or hydroxyl alkyl or 1 to 5 carbon atoms and may be the same or different provided that where $R_2$ is hydrogen or hydroxy, $R_3$ and $R_4$ are other than hydrogen or other than simultaneously hydroxy, further provided that where $R_2$ is linked to $R_3$ or $R_4$, said linkage is a lactone linkage formed from the corresponding compound wherein $R_2$ is COOH and $R_3$ or $R_4$ are hydroxy.

Expressed in more general terms, the solvents include lower alkanoic acids (some of which are respiratory and skin irritants); the lactones of lower alkanoic acids, bisalkoxy substituted alkyl ethers, the alkanoyl and dialkanoyl esters of diols and hydroxy alkanoic esters and hydroxy ethers of lower alkanols or alkadiols.

The compositions of the present invention have the particular advantage that they may be cured directly. The conventional intermediate drying step prior to exposure to the source of UV light used to cure them is not required.

DESCRIPTION OF THE PREFERRED EMBODIMENTS

The UV curable compositions of the present invention comprise a multi-functional, substantially non-oxygen inhibited polyacrylate, a solvent/diluent as well as a catalyst and a plasticizer. The use of catalysts and plasticizers is substantially conventional. The most suitable multi-functional polyacrylates utilized as monomers comprise those incorporating pentaerythritol. For purposes of exemplification but not limitation, there may be mentioned pentaerythritol triacrylate pentaerythritol tetracrylate modified by reaction with aromatic or aliphatic isocyanates such as Mobay aromatic isocyanate Desmondur IL and aliphatic isocyanate Desmondur N75 and dipentaerythritol hydroxypentacrylate, the later being especially preferred. These polyacrylates which are excellent and fast curing monomers, are generally speaking, too viscous to be readily utilized in thin coatings such as those required for covering labels and the like. The viscosity is cut by using a solvent/diluent. Utilizing the solvent/diluents of the present invention in a ratio of between 1 part of solvent to between 1 and 9 parts of monomer, the viscosity can be substantially cut. For example, using a ratio of 2 parts of monomer (DPHPA) to 1 part of solvent (dipropylene glycol) the viscosity is reduced from approximately 4,400 cps at 26°/C. to approximately 400 cps at the same temperature.

It is further preferred that the solvents of the present invention have an elevated boiling point, suitably they should have a boiling point exceeding 115° C.

The entire composition should be substantially anhydrous. The efficiency of cure is reduced with increasing water content of the composition thus, it is desirable to maintain the water content of the entire composition below 2% preferably below 1% by weight. Water is not incorporated into the cured matrix and separates, causing a poor porous film, whose mechanical properties are inferior.

The solvents of the present invention may be generally expressed within the following formula:

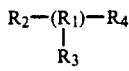

$R_1$ is suitably a straight or branched chain alkanetriyl moiety of 3 to 6 carbon atoms, for example, ethanetriyl, propanetriyl, butanetriyl, pentanetriyl or hexanetriyl, most preferably propanetriyl.

$R_2$ is suitably hydrogen, hydroxy or COOH.

$R_3$ and $R_4$ are selected from the group consisting of hydrogen, hydroxyl, alkoxycarbonyl, alkylcarboxy and alkoxy and alkoxy-alkoxy groups wherein the alkyl moiety may be further substituted by a hydroxy group.

While the alkyl groups may have between 1 and 5 carbon atoms, it is generally preferred that the alkyl moiety be ethyl, methyl or propyl. It should be noted for example, that acetic acid is an excellent solvent-/diluent form the point of view of providing a fast hard cure. However, due to its irritant properties, although it is operative, it would probably not be used in commercial practice.

While the compositions of this invention give satisfactory results with a wide variety of solvents, excellent results are obtained where the solvent has a skeleton of 3 carbon atoms. Included in this group are the esters of lactic acid, especially ethyl lactate, dipropylene glycol (di 2-hydroxypropyl ether), propylene glycol monomethyl ether, and propylene glycol monomethyl ether acetate. It is to be noted that the boiling point range of these especially preferred solvents lies between 120° C. and 233° C.

As stated previously, the other components of the curable composition are conventional. As a catalyst, there may be utilized 1-hydroxycyclo ethylphenyl ketone (sold by Ciba as Irgacure 184), utilized in a ratio of about 1 part of catalyst to between 10 and 50, suitably 25 parts of monomer and, as a plasticizer, an epoxy resin such as Epirez 510 (sold by Celanese) which is utilized at a ratio of about 3 parts of plasticizer per 10 to 50, suitably 25 parts of monomer. All parts being by weight.

The curable compositions of the present invention may be utilized in the following, substantially conventional manner. An amount of solvent/diluent is added to the monomer which is sufficient to reduce its viscosity at about 26° C. to between about 500 to about 20, suitably to about 200 cps.

The material to be coated by the composition is then coated by any conventional coating means, such as printing, screening, spraying, drawing down, and the like, to provide a coating which, upon curing, provides a layer of thickness between from about 3 to about 4 microns up to about 250 microns. The substrates upon which these coating compositions are placed include paper, glass, vinyl, polycarbonate, SBS board, polyester, and the like. This list is given for purposes of exemplification and not limitation.

The coating is then exposed to ultraviolet light in the conventional manner, however the previously conventional intermediate drying step prior to the cure step is not needed and is omitted. For coatings of the foregoing thickness, it has been found that exposure to a 200 watt UV lamp (American Ultraviolet Portacure Unit) at a distance of approximately 10 centimeters from the coating for less than one (1) second is sufficient to obtain a hard, substantially scratch-proof surface.

EXAMPLE I

An ultraviolet curable composition is prepared utilizing the following components:

| | |
|---|---|
| dipentaerythritol hydroxypentacrylate | 250 g. |
| propyleneglycol monomethylether | 65 g. |
| Irgacure 184 | 10 g. |
| Epirez 510 | 30 g. |

The foregoing components are mixed to provide a coating composition of approximately 200 cps at 26° C. A bar is wrapped with No. 3 gauge wire placed in the coating solution and drawn over a vinyl sheet substrate. The coating on the substrate is then exposed for less than one (1) second, approximately 10 centimeters from a 200 watt ultraviolet lamp (American Ultraviolet Portacure Unit). There is provided a clear hard coating meeting standard requirements for scratch resistance.

EXAMPLE II

| | |
|---|---|
| DPHPA | 10 g. |
| Solvent | 5 g. |
| Irgacure 184 | 0.75 g. |

In accordance with the foregoing procedure, tests were carried out with 22 different solvents as set forth in Table 1 below. The results of these are indicated in the Table. The designation Excellent means that a satisfactory cure was obtained in less than one (1) second, whereas the designation Good indicates that a satisfactory cure was obtained but an exposure in excess of one (1) second was required. An Asterisk (*) indicates a solvent/diluent outside the scope of the Claims of the present invention.

TABLE 1

| Diluents and Plasticizers Tested [Ratings on Cure Speed: Excellent, Good, Poor, No Good, Incompatible] | |
|---|---|
| N-propyl acetate | No Good* |
| Ethylene glycol diacetate | Good |
| Bis-(2-Methoxyethyl) ether | Good |
| Glycerin | Incompatible* |
| Ethyl Lactate - $CH_3CHOHCOOC_2H_5$ (b.p. 154° C.) | Excellent |
| Dipropylene Glycol - $(CH_3CHOHCH_2)_2O$ (b.p. 233° C.) | Excellent |
| Dow DE-Diethylene glycol ethyl ether | Good |
| DOP (Dioctylphthalate) | No Good* |
| Propylene glycol | Incompatible* |
| Dipropylene glycol monomethylether | Good |
| Butyl Di glyme | Poor* |
| Propylene glycol monomethylether $CH_3OCH_2CHOHCH_3$ (b.p. 120°) | Excellent |
| Octanol | No Good* |
| DBE DuPont Mixed Aliphatic Dimethyl Esters | Poor* |
| Tripropyleneglycol monomethyl ether | Poor* |
| Butyl lactate | Good |
| Butyrolactone | Good |
| Propylene glycol monomethylether acetate | Excellent |
| Diacetone alcohol | Poor* |
| 2-Ethyl-1-hexanol | Incompatible* |

RESULTS

Ethyl lactate has the most desirable properties for a diluent; however, propyleneglycol monomethylether acetate, dipropyleneglycol, propylene glycol monomethylether also highly desirable.

I claim:

1. A method of curing a substantially anhydrous UV curable composition of less than 2% w/w water consisting essentially of between 1 and 9 parts of monomer and 1 part of solvent of a b.p. exceeding 115° C. wherein the monomer is a multi-functional, non-oxygen inhibited polyacrylate and the solvent is a member selected from the group of solvents of the formula

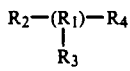

wherein $R_1$ is an straight or branched chain alkanetriyl moiety of 3 to 6 carbon atoms, $R_2$ is selected from the group consisting of hydrogen, hydroxy and COOH, $R_3$ and $R_4$ are selected from the group consisting of hydrogen, OH, $-(CO)OR_5$, $-O(CO)R_6$, $R_7O-$ and $R_7OR_8O-$, wherein $R_5$, $R_6$, $R_7$ and $R_8$ are straight or branched chain alkyl or hydroxyl alkyl of 1 to 5 carbon atoms and may be the same or different provided that where $R_2$ is hydrogen or hydroxy, $R_3$ and $R_4$ are other than hydrogen or other than simultaneously hydroxy, provided that where $R_2$ is hydroxy only one of $R_3$ and $R_4$ may be hydroxy, further provided that where $R_2$ is linked to $R_3$ or $R_4$, said linkage is a lactone linkage formed from the corresponding compound wherein $R_2$ is COOH and $R_3$ and $R_4$ are hydroxy, in the presence of an UV activated catalyst, which comprises exposing said composition in the undried state of a source of UV radiation.

2. A method of claim 1 wherein the composition additionally comprises a plasticizer.

3. A method of claim 1 wherein there are utilized 1 part by weight of catalyst per 10 to 50 parts by weight of monomer.

4. A method of claim 1 utilizing a composition comprising between 1 and 2 parts of a monomer per part of solvent.

5. A method of claim 10 wherein $R_2$ is COOH and $R_3$ and $R_4$ are hydrogen.

6. A method of claim 1 wherein $R_2$ is hydrogen, $R_3$ is hydroxy and $R_4$ is $-(CO)OR_5$.

7. A method according to claim 6 wherein $R_1$ is ethanetriyl, and wherein $R_5$ is ethyl or butyl.

8. A method in accordance with claim 7 wherein the solvent is selected from the group consisting of ethyl lactate and butyl lactate.

9. A method according to claim 1 wherein the solvent is dipropylene glycol.

10. A method according to claim 1 wherein the solvent is propylene glycol monomethyl ether.

11. A method according to claim 1 wherein the solvent is propylene glycol monomethyl ether acetate.

* * * * *